(12) United States Patent
Sonnendorfer et al.

(10) Patent No.: US 8,720,911 B2
(45) Date of Patent: May 13, 2014

(54) SHOPPING CART HAVING SLIDING HANDLE

(76) Inventors: Horst Sonnendorfer, Puchheim (DE); Franz Wieth, Puchheim (DE)

( * ) Notice: Subject to any disclaimer, the term of this patent is extended or adjusted under 35 U.S.C. 154(b) by 667 days.

(21) Appl. No.: 12/812,993

(22) PCT Filed: Jan. 15, 2009

(86) PCT No.: PCT/DE2009/000035
§ 371 (c)(1),
(2), (4) Date: Aug. 4, 2010

(87) PCT Pub. No.: WO2009/089824
PCT Pub. Date: Jul. 23, 2009

(65) Prior Publication Data
US 2010/0314847 A1   Dec. 16, 2010

(30) Foreign Application Priority Data
Jan. 15, 2008   (DE) .................. 20 2008 000 606

(51) Int. Cl.
*B62B 3/14*   (2006.01)
(52) U.S. Cl.
USPC .................. 280/33.994; 280/33.992; 194/905
(58) Field of Classification Search
USPC .......................... 280/33.994, 33.992; 194/905
See application file for complete search history.

(56) References Cited

U.S. PATENT DOCUMENTS

| 4,474,280 A * | 10/1984 | Lenander ........................ 194/247 |
| 4,474,282 A * | 10/1984 | Lenander ........................ 194/247 |
| 4,573,564 A * | 3/1986 | Rheeder et al. ................ 194/250 |
| 4,589,538 A * | 5/1986 | Payraudeau ..................... 194/205 |
| 4,645,057 A * | 2/1987 | Schramme et al. ............ 194/246 |
| 4,691,816 A * | 9/1987 | Trubiano ........................ 194/212 |
| 4,766,989 A * | 8/1988 | Maloeuvre et al. ........... 194/257 |
| 4,773,660 A * | 9/1988 | Trubiano .................. 280/33.994 |
| 4,840,264 A * | 6/1989 | Chappoux et al. ............. 194/212 |
| 4,941,560 A * | 7/1990 | Bailey ........................... 194/250 |
| 5,040,656 A * | 8/1991 | DiPaolo et al. ................ 194/212 |
| 5,069,324 A * | 12/1991 | Lepage et al. ................. 194/212 |
| 5,121,823 A * | 6/1992 | Wanzl et al. ................... 194/253 |
| 5,131,517 A * | 7/1992 | DiPaolo et al. ................ 194/257 |
| 5,180,045 A * | 1/1993 | Sonnendorfer et al. ....... 194/212 |
| 5,220,987 A * | 6/1993 | DiPaolo et al. ................ 194/212 |
| 5,236,073 A * | 8/1993 | DiPaolo et al. ................ 194/212 |
| 5,259,633 A * | 11/1993 | Sonnendorfer et al. . 280/33.994 |
| 5,344,225 A * | 9/1994 | Blyth ............................ 312/34.4 |
| 5,540,316 A * | 7/1996 | DiPaolo et al. ................ 194/212 |
| 5,549,409 A * | 8/1996 | Merchel ......................... 403/306 |
| 5,573,097 A * | 11/1996 | Merchel ......................... 194/212 |
| 5,950,792 A * | 9/1999 | DiPaolo .......................... 194/212 |
| 5,951,029 A * | 9/1999 | Sonnendorfer et al. . 280/33.992 |
| 6,250,451 B1 * | 6/2001 | Thirkill ......................... 194/205 |
| 6,830,252 B2 * | 12/2004 | Eberlein et al. .......... 280/33.994 |
| 8,136,275 B2 * | 3/2012 | Sonnendorfer et al. ........ 40/308 |
| 2008/0313938 A1 * | 12/2008 | Sonnendorfer et al. ........ 40/308 |
| 2010/0314847 A1 * | 12/2010 | Sonnendorfer et al. . 280/33.992 |

FOREIGN PATENT DOCUMENTS

| DE | 9308648 U1 | 8/1993 |
| DE | 4235473 A1 | 4/1994 |
| DE | 29714013 U1 | 10/1997 |
| DE | 19734865 A1 | 2/1999 |
| DE | 19830297 A1 | 1/2000 |
| DE | 202005019315 U1 | 5/2007 |
| EP | 0545233 A1 | 6/1993 |
| EP | 0844592 A2 | 5/1998 |
| EP | 0895920 A1 | 2/1999 |
| FR | 2733197 A1 | 10/1996 |
| WO | 03059715 A2 | 7/2003 |

* cited by examiner

*Primary Examiner* — Jeffrey J Restifo
(74) *Attorney, Agent, or Firm* — Laurence A. Greenberg; Werner H. Stemer; Ralph E. Locher

(57) ABSTRACT

The invention relates to a shopping cart having a sliding handle, which has module-like functional elements, wherein the functional elements are substantially accommodated in a recess of the sliding handle and protrude so far out of the sliding handle that good usability of the functional elements is given.

15 Claims, 3 Drawing Sheets

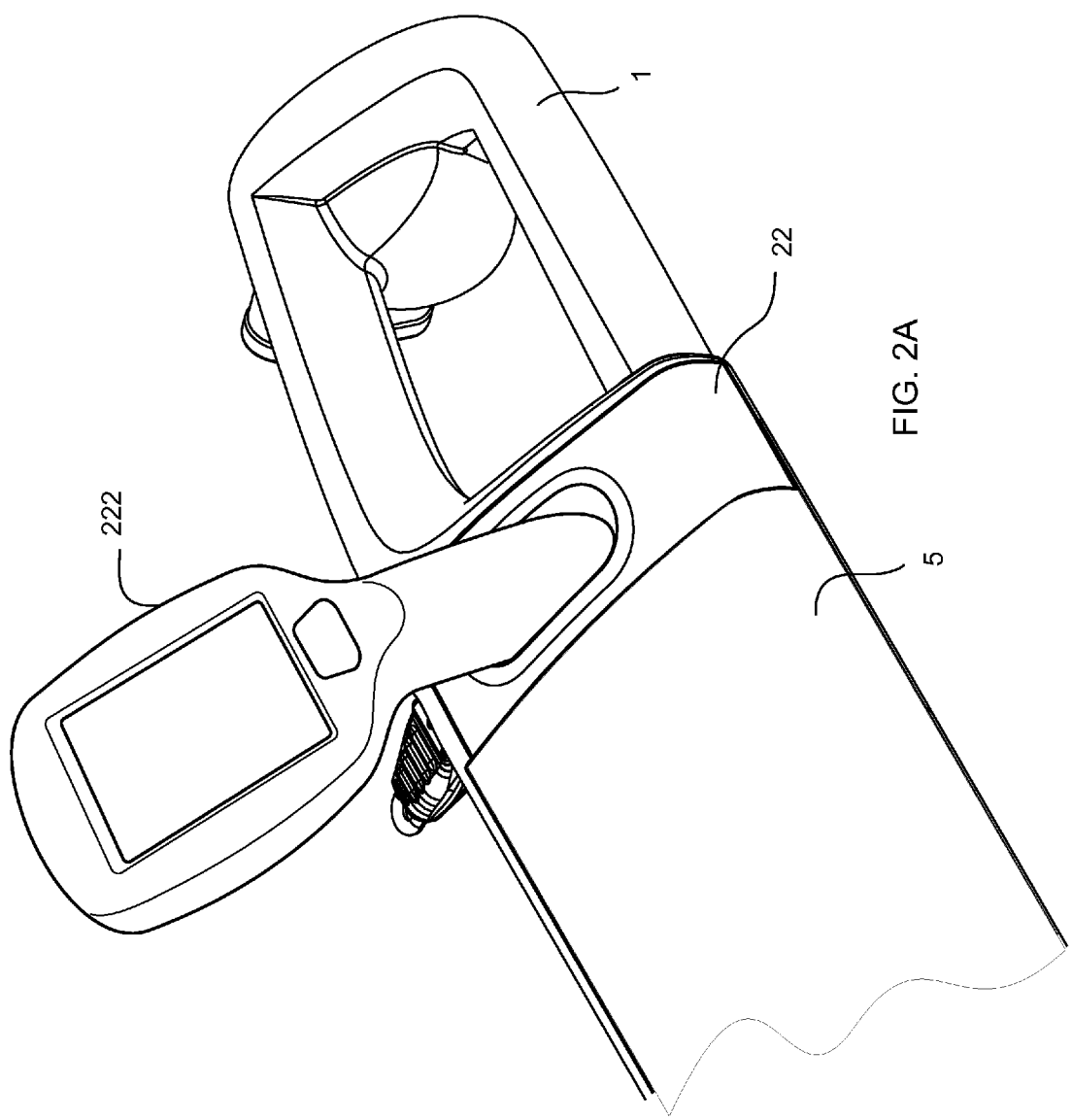

SHOPPING CART HAVING SLIDING HANDLE

TECHNICAL FIELD

The invention relates to a shopping cart having a pushing handle which has functional elements which can be inserted in a modular manner.

PRIOR ART

EP 0537404 B1 has disclosed a pushing handle having functional elements. The pushing handle there has an advertising surface and a coin lock apparatus as functional elements.

The substantially horizontal advertising surface is situated on its upper side. The coin slot of the coin lock apparatus is situated on the vertical front side of the pushing handle.

It is advantageous for the legibility of the advertising surface if it is inclined approximately in the direction of the user of the shopping cart. In the known apparatus, an inclination of the advertising surface can be achieved by inclining the entire pushing handle. As a result, however, the front side of the pushing handle would no longer be vertical, as a result of which the coin can no longer be inserted as comfortably into the coin slot of the coin lock apparatus.

DISCLOSURE OF THE INVENTION

Technical Object

It is an object of the invention to provide a shopping cart having a pushing handle, the pushing handle having further functional elements in addition to the functional element of the advertising surface, and it being possible to operate said further functional elements easily and comfortably, even if the functional element which acts as an advertising surface is inclined in the direction of the user.

Technical Solution

The stated object is achieved by it being possible for the further functional elements to be inserted into a recess of the pushing handle, and by the inserted functional elements protruding out of the inclined plane of the pushing handle, in which plane the advertising surface lies.

Advantageous Effects

This advantageously brings about a situation where the further functional elements are accessible comfortably. In the case of the functional element which acts as a coin lock apparatus, the coin slot is readily accessible obliquely from above and part of the inclined plane which can serve as a hand support during insertion of the coin still remains below the coin slot.

The further functional elements can be inserted in a modular manner next to the functional element which acts as an advertising surface. This advantageously makes an individual flexible design of the pushing handle possible. It is thus possible, for example, to insert another functional element into the pushing handle instead of the functional element which acts as a coin lock apparatus. Another functional element of this type can be, for example, a holding device for an electronic unit which is used by the user of the shopping cart for what is known as "self-scanning", or a magnifying glass.

It is also possible, in addition to the functional element which serves as an advertising surface, to insert a plurality of additional functional elements into the pushing handle. For example, a functional element with a magnifying glass and a functional element for a coin lock apparatus can be inserted into the pushing handle.

BRIEF DESCRIPTION OF THE DRAWINGS

FIG. 2A shows the pushing handle with a barcode scanner and

FIG. 1 shows a view of the interior of the pushing handle 1. The coin lock apparatus 2 is an independent modular functional element which is inserted into the pushing handle 1.

Figure 1:
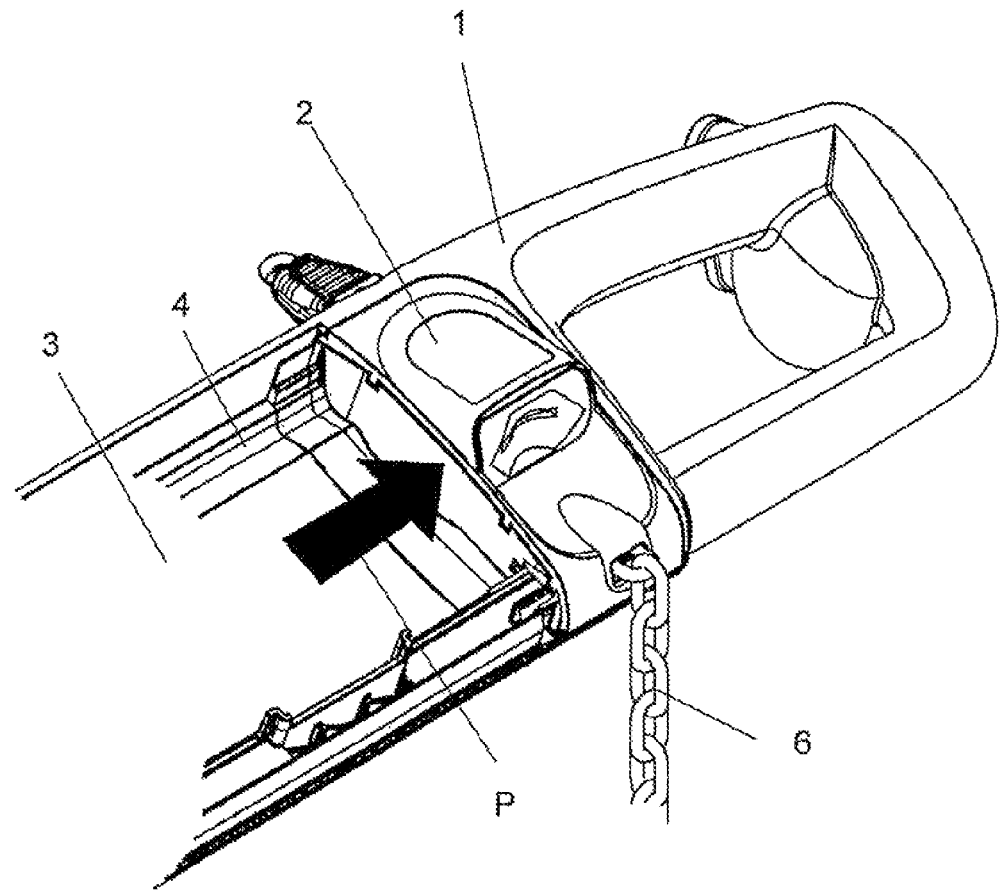
FIG. 1 shows a part of the pushing handle with an open recess.

There are grooves 4 in a receiving space 3 of the pushing handle 1, which grooves 4 correspond with appropriate tongues on the functional unit which acts as a coin lock apparatus 2.

In the case of a finally assembled pushing handle 1, this receiving space 3 is closed by a cover 5 and cannot be seen by the user.

During the assembly of the coin lock apparatus 2, it is inserted into the receiving space 3, is introduced into the grooves 4 and is subsequently displaced in the direction of the arrow P until it has reached an end position. In this end position, the coin lock apparatus 2 bears directly against the edge of the receiving space 3.

The coin lock apparatus 2 is designed in such a way that the result is a harmonic transition to the pushing handle. The region around the substantially horizontal hand support is of recess-like design and the result is a flowing transition to the cover 5 and the edge of the receiving space 3.

A chain 6 is fastened to the coin lock apparatus 2. A key (not shown in this view) which interacts in a known way with the lock of another coin lock apparatus is situated at the end of the chain 6. This results in a finished unit which can be assembled quickly. No tool is advantageously necessary to assemble the coin lock apparatus 2.

The coin lock apparatus 2 remains fixed by way of snap-in lugs (not visible in this view) which latch as soon as the coin lock apparatus 2 has reached its end position. The grooves extend in the receiving space 3 parallel to the axis of the pushing handle 1 and therefore also transversely with respect to the usual direction, from which a force acts via the chain 6 on the coin lock apparatus 2. The force which emanates from the chain 6 therefore advantageously does not act on the snap-in lugs. In addition, the coin lock apparatus 2 can also be fixed in this end position by way of a securing screw or a securing pin.

Figure 2:
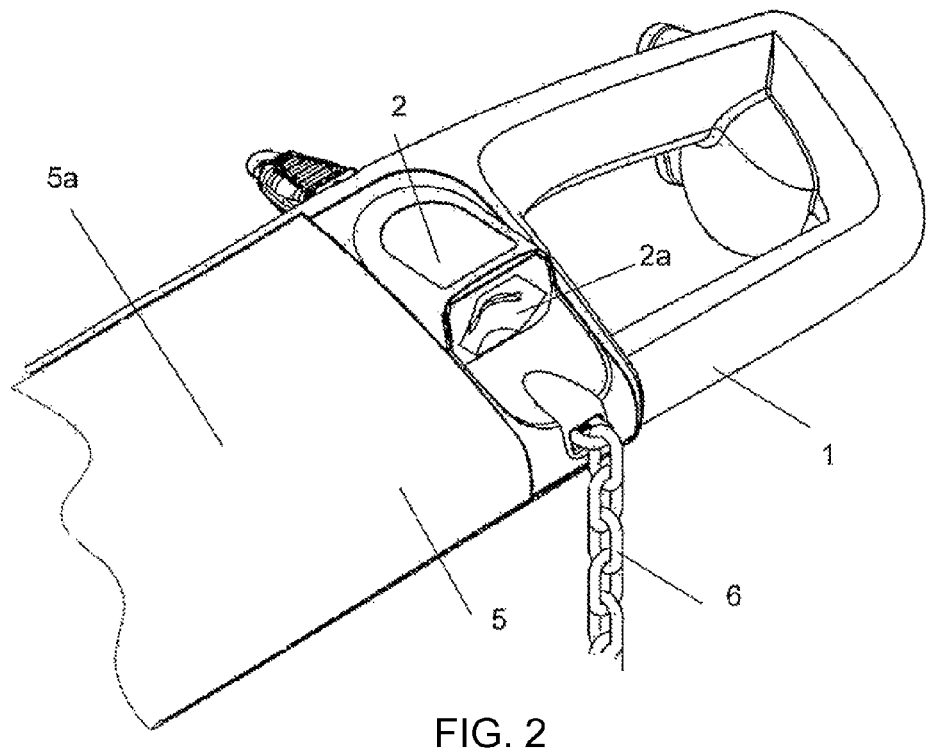
FIG. 2 shows the part of the pushing handle with the recess closed.

FIG. 2 shows the situation, in which the cover 5 closes the receiving space 3.

At the same time, the cover 5 serves as an advertising surface 5a. The advertising can be applied directly to the outside of the cover 5, or the cover 5 is of transparent configuration and then the advertising can be applied to the inside of the cover. In the case of a transparent cover 5, there are guide rails on the inside, into which guide rails an advertising surface can be pushed.

Figure 3:
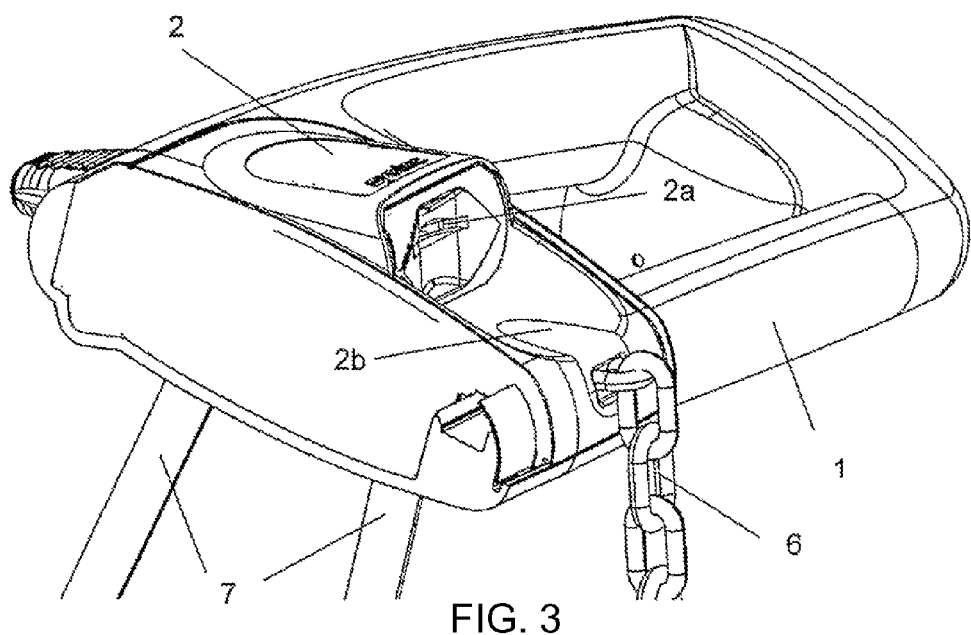
FIG. 3 shows the pushing handle with a part of the shopping cart.

FIG. 3 shows the pushing handle 1 according to the invention in a sectional illustration, which pushing handle 1 is mounted in a known way on the handle carrying arms 7 of a shopping cart.

In the mounted state, the pushing handle 1 is positioned slightly obliquely, as a result of which the advertising surface 5a can be seen in an improved manner by the user of the shopping cart. The coin lock apparatus 2 extends substantially horizontally. The result of this is that the region of the coin lock apparatus 2, in which region the coin slot 2a is situated, protrudes somewhat out of the plane with the advertising surface.

A substantially horizontally extending surface 2b is situated below the coin slot 2a, which surface 2b can serve as a hand support for the user during the insertion and removal of the coin and thus makes the insertion and removal more comfortable.

The mounting of another modular functional element 22, for example a magnifying glass or a holder for a scanner 222 which can be operated by the user of the shopping cart, takes place in the same way.

It is also possible to insert a plurality of modular functional elements into the receiving space 3. The modular functional elements can then bear against the opposite edges of the receiving space 3 separately from one another, and the cover 5 then closes the part of the receiving space 3 which remains between them.

The individual functional elements are integrated into the overall shape of the pushing handle and protrude out of the plane, in which the surface 5a is situated, to such an extent that satisfactory operating characteristics of the functional elements are achieved.

INDUSTRIAL APPLICABILITY

The invention is industrially applicable in every type of shopping cart which is made available to the customers against a deposit.

The invention claimed is:

1. A shopping cart having a pushing handle, into which functional elements can be inserted in a modular manner, the pushing handle having a receiving space for functional elements, and the functional elements being held in the receiving space such that they can be removed again, characterized in that the pushing handle has an inclined face, to which advertising can be attached, and the functional element which is inserted into the receiving space protrudes out of the plane, in which the inclined face is situated, and the opening of the receiving space which remains when the functional element is inserted being closed by a cover, and the cover can be used as an advertising carrier, the functional element being a coin lock apparatus, a region of the coin lock apparatus, in which a coin slot is situated, protruding out of a plane, in which the inclined face is situated.

2. The shopping cart having a pushing handle as claimed in claim 1, characterized in that there is a substantially horizontally running face below the coin slot.

3. The shopping cart having a pushing handle as claimed in claim 1, characterized in that there are grooves respectively tongues in the receiving space, into which tongues and grooves of a correspondingly complementary configuration of the functional elements can be pushed.

4. The shopping cart having a pushing handle as claimed in claim 3, characterized in that the tongues and grooves which are present in the receiving space extend substantially parallel to the axis of the pushing handle.

5. The shopping cart having a pushing handle as claimed in claim 1, characterized in that the functional element is a holding device for a product scanner which can be operated by the customer.

6. A shopping cart pushing handle,
the pushing handle comprising:
a body having a receiving space defined as an opening for receiving functional elements therein, the functional elements for being removably held in the receiving space, the receiving space having at least one of grooves or tongues, into which a corresponding complementary configuration of at least one of tongues or grooves of the functional elements can be pushed;
providing a coin lock apparatus as a functional element; and
an inclined face, wherein a region of the coin lock apparatus in which a coin slot is situated, protrudes out of a plane, in which the inclined face is situated.

7. The pushing handle according to claim 6, further comprising a functional element inserted into the receiving space protruding out of a plane in which the inclined face is situated, the inclined face for having advertising attached thereon.

8. The pushing handle according to claim 6, wherein there is a substantially horizontally running face below the coin slot.

9. The pushing handle according to claim 6, wherein the at least one of tongues or grooves in the receiving space extend substantially parallel to an axis of the pushing handle.

10. The pushing handle according to claim 6, further comprising providing a holding device for a product scanner operable by a customer.

11. The pushing handle according to claim 6, further comprising a cover inserted into a remaining portion of the opening when a functional element is inserted in the receiving space, the cover for closing the opening.

12. The pushing handle according to claim 6, further comprising a cover inserted into the opening of the receiving space for closing the opening.

13. The pushing handle according to claim 6, further comprising snap-in-lugs for fixing the coin lock in an end position of the receiving space.

14. The pushing handle according to claim 6, further comprising an additional functional element inserted into the receiving space.

15. The pushing handle according to claim 14, wherein the coin lock and the additional functional element bear against opposite ends of the receiving element.

* * * * *